US010825574B2

(12) United States Patent
Shimada et al.

(10) Patent No.: US 10,825,574 B2
(45) Date of Patent: Nov. 3, 2020

(54) METHOD FOR MANUFACTURING IONIC CONDUCTOR

(71) Applicants: MITSUBISHI GAS CHEMICAL COMPANY, INC., Tokyo (JP); TOHOKU TECHNO ARCH CO., LTD., Miyagi (JP)

(72) Inventors: Masahiro Shimada, Niigata (JP); Tomohiro Ito, Niigata (JP); Aki Katori, Niigata (JP); Atsushi Unemoto, Miyagi (JP); Shinichi Orimo, Miyagi (JP)

(73) Assignees: MITSUBISHI GAS CHEMICAL COMPANY, INC., Tokyo (JP); TOHOKU TECHNO ARCH CO., LTD., Miyagi (JP)

(*) Notice: Subject to any disclaimer, the term of this patent is extended or adjusted under 35 U.S.C. 154(b) by 0 days.

(21) Appl. No.: 16/069,439

(22) PCT Filed: Jan. 13, 2017

(86) PCT No.: PCT/JP2017/000905
§ 371 (c)(1),
(2) Date: Jul. 11, 2018

(87) PCT Pub. No.: WO2017/126416
PCT Pub. Date: Jul. 27, 2017

(65) Prior Publication Data
US 2019/0080814 A1     Mar. 14, 2019

(30) Foreign Application Priority Data

Jan. 18, 2016   (JP) .................................. 2016-007433
Jan. 18, 2016   (JP) .................................. 2016-007434

(51) Int. Cl.
*H01B 1/12*     (2006.01)
*C01D 15/04*    (2006.01)
(Continued)

(52) U.S. Cl.
CPC ............. *H01B 1/122* (2013.01); *C01D 15/04* (2013.01); *H01B 1/06* (2013.01); *H01B 1/20* (2013.01);
(Continued)

(58) Field of Classification Search
CPC ...... H01B 1/06; H01B 1/122; H01M 10/0562
(Continued)

(56) References Cited

U.S. PATENT DOCUMENTS 7,776,201 B1   8/2010  Vajo et al.
9,722,276 B2   8/2017  Maekawa
(Continued)

FOREIGN PATENT DOCUMENTS

CN   1320979 A       11/2001
CN   105481887 A  *   4/2016  .............. C07F 5/025
(Continued)

OTHER PUBLICATIONS

Severa "Development of Novel Borohydrides as Hydrogen Storage Materials." Phd Dissertation, 2010, https://search.proquest.com/science/docview/761650215/26E77537708D4C8CPQ (Year: 2010).*
(Continued)

*Primary Examiner* — Tri V Nguyen
(74) *Attorney, Agent, or Firm* — Greenblum & Bernstein, P.L.C.

(57) ABSTRACT

The present invention provides a manufacturing method suitable for manufacturing, in large amounts, an ionic conductor that is superior in terms of various properties such as ion conductivity. According to one embodiment of the present invention, provided is a method for manufacturing
(Continued)

an ionic conductor, said method including: mixing, using a solvent, $LiBH_4$ and a lithium halide represented by formula (1), LiX (1) (in formula (1), X represents one selected from the group consisting of halogen atoms); and removing the solvent at 60-280° C. Ionic conductors obtained with this manufacturing method can be used as, for example, solid electrolytes for all-solid-state batteries.

3 Claims, 4 Drawing Sheets

(51) Int. Cl.
    *H01M 10/0562* (2010.01)
    *H01B 1/06* (2006.01)
    *H01B 13/00* (2006.01)
    *H01B 1/20* (2006.01)
    *H01M 4/134* (2010.01)
    *H01M 10/0525* (2010.01)
    *H01M 4/02* (2006.01)

(52) U.S. Cl.
    CPC ............ *H01B 13/00* (2013.01); *H01M 4/134* (2013.01); *H01M 10/0525* (2013.01); *H01M 10/0562* (2013.01); *H01M 2004/027* (2013.01); *H01M 2004/028* (2013.01)

(58) Field of Classification Search
    USPC .................. 252/182.1; 427/123; 429/322
    See application file for complete search history.

(56) References Cited

U.S. PATENT DOCUMENTS

| | | |
|---|---|---|
| 2011/0117440 A1 | 5/2011 | Maekawa et al. |
| 2015/0270571 A1 | 9/2015 | Kambara et al. |
| 2016/0204466 A1 | 7/2016 | Nogami et al. |
| 2016/0204467 A1 | 7/2016 | Nogami et al. |
| 2016/0261001 A1* | 9/2016 | Liang ................ H01M 10/0562 |

FOREIGN PATENT DOCUMENTS

| | | |
|---|---|---|
| JP | 5187703 B2 | 4/2013 |
| JP | 2016-134316 A | 7/2016 |
| WO | 2009/139382 A1 | 11/2009 |
| WO | 2015/030052 A1 | 3/2015 |
| WO | 2015/030053 A1 | 3/2015 |

OTHER PUBLICATIONS

Motoaki Matsuo et al., "Lithium superionic conduction in lithium accompanied by structural transition", Applied Physics Letters 91, 2007, pp. 224103.
Hideki Maekawa et al., "Halide-Stabilized LiBH4, a Room-Temperature Lithium Fast-ion Conductor", Journal of the American Chemical Society, 131, 2009, pp. 894-895.
Shin-ichi Orimo et al., "Complex Hydrides for Hydrogen Storage", Chemical Reviews, 107, 2007, pp. 4111-4132.
International Search Report in International Patent Application No. PCT/JP2017/000905, dated Mar. 28, 2017.
International Preliminary Report on Patentability in International Patent Application No. PCT/JP2017/000905, dated Jul. 24, 2018.
European Search Report, European Patent Office, Application No. 17741296.2, dated Aug. 29, 2019, 8 pages.
Gayatri Sahu et al, "Air-stable high conduction solid electrolytes of arsenic-substitued Li4SnS4", Energy & Environmental Science, vol. 7, No. 3, Dec. 16, 2013, pp. 1053-1058.
Gayatri Sahu et al, "A high-conduction Ge substituted Li3 AsS 4 solid electrolyte with exceptional low activation energy", Journal of Materials Chemistry A, vol. 2, No. 27, Apr. 16, 2014, pp. 10396-10403.
Indian Office Action, Indian Patent Office, Application No. 201817026100, dated Jul. 8, 2020.

* cited by examiner

METHOD FOR MANUFACTURING IONIC CONDUCTOR

TECHNICAL FIELD

The present invention relates to a method for manufacturing an ionic conductor.

BACKGROUND ART

Recently, a demand for lithium-ion rechargeable batteries has been increased in applications including portable information terminals, portable electronic equipments, electric vehicles, hybrid electric vehicles and stationary power storage systems. However, currently, a flammable organic solvent is used as an electrolytic solution in lithium-ion rechargeable batteries, and a strong exterior is required so that an organic solvent does not leak out. Further, for example, in the case of portable personal computers, it is necessary to employ a structure against a risk at the time when an electrolytic solution leaks out. Thus, there is a limitation on structures of devices.

Moreover, the range of applications thereof has been widened to movable bodies such as vehicles and aircrafts, and a high capacity is desired for stationary lithium-ion rechargeable batteries. Under such circumstances, importance tends to be placed on safety more than before, and efforts are concentrated on the development of an all-solid-state lithium-ion rechargeable battery in which none of toxic substances such as organic solvents is used.

Use of an oxide, phosphate compound, organic polymer, sulfide or the like as a solid electrolyte in an all-solid-state lithium-ion rechargeable battery has been examined.

However, oxides and phosphate compounds have a characteristic that particles thereof are hard. Accordingly, in order to form a solid electrolyte layer by using these materials, it is generally required to perform sintering at a high temperature (600° C. or higher), and it is laborious. Moreover, when using an oxide or phosphate compound as a material for a solid electrolyte layer, there is a drawback that the interface resistance between that and an active material increases. In the case of organic polymers, there is a drawback that lithium-ion conductivity at room temperature is low and the conductivity is rapidly reduced when the temperature is decreased.

Regarding a novel Li-ion solid-state conductor, in 2007, it was reported that the high temperature phase of $LiBH_4$ that is a complex hydride solid electrolyte has high lithium-ion conductivity (Non-Patent Document 1). The density of $LiBH_4$ is low, and when using this as a solid electrolyte, a light battery can be prepared. Further, since $LiBH_4$ is stable even at high temperatures (for example, about 200° C.), a heat-resistant battery can also be prepared.

$LiBH_4$ has a problem that the lithium-ion conductivity thereof is significantly reduced at a temperature lower than 115° C. that is the phase transition temperature. In this regard, for obtaining a solid electrolyte having high lithium-ion conductivity even at a temperature lower than 115° C. that is the phase transition temperature, a solid electrolyte obtained by using $LiBH_4$ in combination with an alkali metal compound has been proposed. For example, in 2009, it was reported that a high temperature phase of a solid solution obtained by adding LiI to $LiBH_4$ can be kept even at room temperature (Non-Patent Document 2 and Patent Document 1). Further, since a complex hydride solid electrolyte made of this solid solution is stable against metallic lithium and this metallic lithium can be used for a negative electrode, it is possible to prepare an all-solid-state battery having high capacity (Patent Document 2 and Patent Document 3).

In this regard, there is a report that a solid solution obtained by adding LiI to $LiBH_4$ is produced at a small scale by means of mechanical milling using a planetary ball mill or melt-mixing at a high temperature. However, there are problems that it is difficult to increase the size of an apparatus of planetary ball mill, and that in melt-mixing at a high temperature, $LiBH_4$ is gradually decomposed while releasing hydrogen at about 300° C. (Non-Patent Document 3).

Further, for example, in the case of the ionic conductor described in Patent Document 1, a more expensive compound having a low water content (less than 50 ppm) is used as an alkali metal compound, and there is a room for further improvement in terms of the cost.

PRIOR ART DOCUMENTS

Patent Documents

Patent Document 1: Japanese Patent No. 5187703
Patent Document 2: International Publication WO2015/030052 pamphlet
Patent Document 3: International Publication WO2015/030053 pamphlet

Non-Patent Documents

Non-Patent Document 1: Applied Physics Letters (2007) 91, p. 224103
Non-Patent Document 2: Journal of the American Chemical Society (2009), 131, pp. 894-895
Non-Patent Document 3: Chemical Reviews (2007) 107, pp. 4111-4132

SUMMARY OF THE INVENTION

Problems to be Solved by the Invention

The objective of the present invention is to provide a manufacturing method suitable for mass production of an ionic conductor that is excellent in various characteristics including ion conductivity.

Means for Solving the Problems

The present inventors diligently made researches in order to solve the above-described problem, and obtained an unexpected finding that an ionic conductor that is excellent in various characteristics including ion conductivity, like ionic conductors obtained by a conventional melt-mixing method or mechanical milling method, can be obtained by mixing $LiBH_4$ and a lithium halide using a solvent and removing the solvent at a temperature within a specific range. Moreover, the present inventors found that this method can be applied to mass production. The present invention was achieved based on the above-described findings.

Specifically, the present invention has characteristics described below.

[1] A method for manufacturing an ionic conductor, said method including: mixing, using a solvent, $LiBH_4$ and a lithium halide represented by formula (1):

$$LiX \tag{1}$$

wherein X represents one selected from the group consisting of halogen atoms; and removing the solvent at 60 to 280° C.
[2] The method for manufacturing an ionic conductor according to item [1], wherein the ionic conductor has diffraction peaks at at least 2θ=23.9±1.2 deg, 25.6±1.5 deg, 27.3±1.5 deg, 35.4±2.0 deg and 42.2±2.0 deg in X-ray diffraction (CuKα: λ=1.5405 Å).
[3] The method for manufacturing an ionic conductor according to item [1] or [2], wherein the solvent is an ether-based solvent.
[4] The method for manufacturing an ionic conductor according to item [3], wherein the ether-based solvent is selected from tetrahydrofuran, 2-methyltetrahydrofuran and cyclopentyl methyl ether.
[5] The method for manufacturing an ionic conductor according to any one of items [1] to [4], wherein the lithium halide has a water content of 50 ppm or more and less than 70000 ppm.
[6] The method for manufacturing an ionic conductor according to any one of items [1] to [5], wherein the lithium halide has a water content of 50 to 26000 ppm.
[7] A solid electrolyte for all-solid-state batteries, which comprises an ionic conductor obtained by a method including:
mixing, using a solvent, LiBH$_4$ and a lithium halide represented by formula (1):

LiX (1)

wherein X represents one selected from the group consisting of halogen atoms; and removing the solvent at 60 to 280° C.
[8] An all-solid-state battery, which is obtained by using the solid electrolyte for all-solid-state batteries according to item [7].

Advantageous Effect of the Invention

According to the present invention, it is possible to provide a manufacturing method suitable for mass production of an ionic conductor that is excellent in various characteristics including ion conductivity.

BEST MODE FOR CARRYING OUT THE INVENTION

Figure 1:
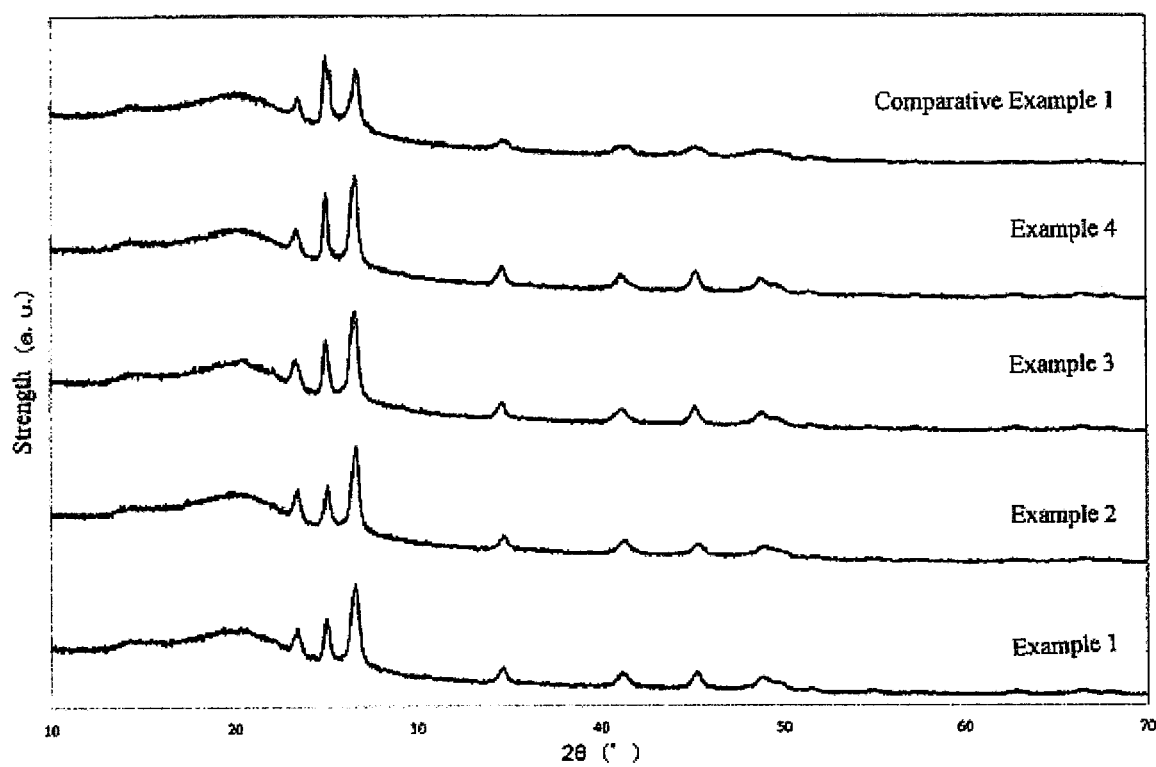
FIG. 1 shows X-ray diffraction patterns of the ionic conductors obtained in Examples 1-4 and Comparative Example 1.

Hereinafter, the embodiment of the present invention will be described. Note that materials, constitutions, etc. described below do not limit the present invention and can be modified variously within the range of the gist of the present invention.
1. Method for Manufacturing Ionic Conductor
According to one embodiment of the present invention, it is possible to provide a method for manufacturing an ionic conductor, which includes: mixing, using a solvent, LiBH$_4$ and a lithium halide represented by formula (1):

LiX (1)

wherein X represents one selected from the group consisting of halogen atoms; and removing the solvent at 60 to 280° C.

As a conventional method for manufacturing an ionic conductor, a mechanical milling method using a planetary ball mill, wherein LiBH$_4$ and an alkali metal compound are used as raw materials, or the melt-mixing method described in Japanese Patent No. 5187703 has been employed. However, in the case of the mechanical milling method, it is difficult to carry out increase in scale to an industrial scale, and in the case of the melt-mixing method, due to heating to 300° C. or higher, LiBH$_4$ may be decomposed and hydrogen gas may be generated. Meanwhile, according to the manufacturing method of the present invention, since a solvent is used for mixing LiBH$_4$ and a lithium halide, a large amount of a homogenous mixture can be synthesized. In addition, according to the manufacturing method of the present invention, a high temperature like that for melt mixing is not required and a solvent can be removed at 60 to 280° C., and as a result, decomposition of LiBH$_4$ can be suppressed and generation of hydrogen can also be suppressed.

As LiBH$_4$ to be used in the manufacturing method of the present invention, usually commercially available products can be used. The purity thereof is preferably 90% or more, and more preferably 95% or more. This is because a compound having a purity within the above-described range has high performance as an ionic conductor. Further, a commercially available LiBH$_4$ in the solid state may be used, and a commercially available LiBH$_4$ in the solution state dissolved in a solvent such as THF may also be used. Note that in the case of a solution, the purity thereof, wherein a solvent is removed, is preferably 90% or more, and more preferably 95% or more.

As described above, X of the lithium halide (LiX) is a halogen atom, which is selected from an iodine atom, a bromine atom, a fluorine atom, a chlorine atom, etc. X is preferably an iodine atom. As the lithium halide, one type of a lithium halide may be used solely, or two or more types of lithium halides may be used in combination.

The mixing ratio between LiBH$_4$ and the lithium halide is not particularly limited, but when the molar ratio between them is defined as LiBH$_4$: LiX=x: (1−x), x is preferably 0.50 to 0.98, and more preferably 0.65 to 0.90.

The solvent is not particularly limited, and various organic solvents can be used as the solvent. Examples of such organic solvents include an ether-based solvent such as tetrahydrofuran and diethyl ether, and an amide-based solvent such as N,N-dimethylformamide and N,N-dimethylacetamide. Among them, an ether-based solvent is preferred. As the ether-based solvent, substances, which are stable against raw materials, and in which the solubility of raw materials is high, can be used. Examples thereof include dimethyl ether, diethyl ether, dibutyl ether, diethylene glycol dimethyl ether, tetrahydrofuran, 2-methyltetrahydrofuran, 1,2-dimethoxyethane, triethylene glycol dimethyl ether, cyclopentyl methyl ether, methyl t-butyl ether and dioxane. Among them, tetrahydrofuran, 2-methyltetrahydrofuran and cyclopentyl methyl ether are more preferred.

The mixing method is not particularly limited, and general mixing methods can be used. Note that at the time of mixing, when one of substrates is dissolved, the other substrate may be incompletely dissolved (slurry state). Preferably, all the substrates are dissolved in the solvent to provide a homogeneous state. When such a state is undergone, an ionic conductor having better ion conductivity can be produced.

When determining the concentration of the substrates in the method for mixing of the solution, it is important to dissolve all the substrates for obtaining a homogeneous ionic conductor. However, when the concentration is too low, the amount of the solvent to be removed increases and therefore it is not efficient. For this reason, in the case of the ether-based solvent, the concentration of the substrates is preferably 1 to 60 wt %, more preferably 10 to 55 wt %, and even more preferably 20 to 50 wt %.

The temperature for solution mixing is not particularly limited. Further, heating is not required but can be performed for increasing the solubility or dissolution speed of the substrates. When heating is performed, it is sufficient when it is performed at a temperature that is the boiling point of the solvent or lower. However, heating can be performed at a temperature up to 200° C. under the pressurized state using an autoclave or the like. When the temperature is 200° C. or lower, decomposition of $LiBH_4$ can be sufficiently suppressed.

Regarding the mixing time, it is sufficient when the time necessary for obtaining a homogenous mixture can be ensured. The time is often influenced by a manufacturing scale, but for example, a sufficiently homogenous mixture can be obtained by mixing for 0.1 to 5 hours.

After the mixture becomes homogeneous, the solvent must be removed for obtaining the ionic conductor. The solvent is removed by means of heated-air drying or vacuum drying, and the optimum temperature for it varies depending on the type of the solvent. The time for removing the solvent can be shortened by applying a temperature sufficiently higher than the boiling point. The temperature for removing the solvent is 60 to 280° C. When the temperature is 60° C. or higher, the solvent in the ionic conductor can be sufficiently removed and adverse effects on ion conductivity can be diminished. Further, when the temperature is 280° C. or lower, decomposition of the ionic conductor and change in quality of crystal can be sufficiently suppressed. The temperature for removing the solvent is preferably 100 to 250° C., and more preferably 150 to 220° C. By removing the solvent under reduced pressure as in the case of vacuum drying or the like, the temperature at the time of removing the solvent can be lowered and the required time can be shortened. In addition, the time required for removing the solvent can also be shortened by flowing an inert gas such as nitrogen and argon in which the moisture content is sufficiently low.

In order to progress crystallization of the ionic conductor obtained in the above-described manner, heat treatment can be performed. The heating temperature is usually 50 to 300° C., more preferably 60 to 250° C., and particularly preferably 65° C. or higher and lower than 200° C. When the temperature is 50° C. or higher, crystallization tends to easily occur, and when the temperature is 300° C. or lower, decomposition of the ionic conductor and change in quality of crystal can be sufficiently suppressed. Note that when heating is performed for removing the solvent in the manufacturing method of the present invention, crystallization proceeds simultaneously and therefore it is efficient.

The heating time slightly varies depending on the heating temperature, but usually, crystallization is sufficiently performed when the heating time is 0.1 to 12 hours. The heating time is preferably 0.3 to 6 hours, and more preferably 0.5 to 4 hours. From the viewpoint of suppressing change in quality of the ionic conductor, it is preferred to set a shorter heating time.

Since alkali metal compounds having a low water content are expensive, from the viewpoint of the cost, it is desirable to use a lithium halide having a high water content. However, when using a conventional mechanical milling method or the melt-mixing method described in Japanese Patent No. 5187703, $LiBH_4$ may be decomposed, for example, at the time when water in a lithium halide directly acts on $LiBH_4$ when heating, and for this reason, it was impossible to use a lithium halide having a high water content.

Meanwhile, according to the manufacturing method of the present invention, the direct action of water in the lithium halide on $LiBH_4$ can be prevented by mixing $LiBH_4$ and the lithium halide using the solvent. In addition, water in the lithium halide can be removed when removing the solvent at 60 to 280° C. For this reason, a lithium halide having a high water content can be used without any problem. According to a preferred embodiment of the manufacturing method of the present invention, even when the water content in the lithium halide is 50 ppm or more, an ionic conductor having excellent ion conductivity can be obtained. The upper limit of the water content in the lithium halide is not particularly limited, but from the viewpoint of ion conductivity, it is preferably less than 70000 ppm, and more preferably 26000 ppm or less. Thus, according to a preferred embodiment of the present invention, the cost required for the lithium halide can be significantly reduced.

2. Ionic Conductor

According to another embodiment of the present invention, an ionic conductor, which can be manufactured by the above-described manufacturing method, is provided. The ionic conductor manufactured by the above-described manufacturing method has excellent ion conductivity. As described above, $LiBH_4$ has the problem that lithium-ion conductivity is significantly reduced at less than 115° C. that is the phase transition temperature. However, in the case of the ionic conductor of the present invention, such reduction in lithium-ion conductivity is less likely to occur, and excellent ion conductivity can be obtained in a wide temperature range. In addition, according to a preferred embodiment of the present invention, the ionic conductor has a property that ion conductivity is less likely to vary depending on the temperature (specifically, the difference between ion conductivity at low temperatures and ion conductivity at high temperatures is small). Moreover, since the ionic conductor of the present invention is a crystal, it is superior to glass on the point that it is mechanically and thermally stronger.

The ionic conductor obtained by the manufacturing method of the present invention preferably has diffraction peaks at at least $2\theta=23.9\pm1.2$ deg, $25.6\pm1.5$ deg, $27.3\pm1.5$ deg, $35.4\pm2.0$ deg and $42.2\pm2.0$ deg in X-ray diffraction (CuK$\alpha$: $\lambda=1.5405$ Å). The ionic conductor more preferably has diffraction peaks at at least $2\theta=23.6\pm0.8$ deg, $25.2\pm0.8$ deg, $26.9\pm1.0$ deg, $35.0\pm1.2$ deg and $41.4\pm1.2$ deg, even more preferably has diffraction peaks at at least $2\theta=23.5\pm0.5$ deg, $24.9\pm0.5$ deg, $26.7\pm0.5$ deg, $34.6\pm0.7$ deg and $40.9\pm0.7$ deg, and particularly preferably has diffraction peaks at at least $2\theta=23.5\pm0.3$ deg, $24.9\pm0.3$ deg, $26.7\pm0.3$ deg, $34.6\pm0.5$ deg and $40.9\pm0.5$ deg. These diffraction peaks at five regions correspond to diffraction peaks of the high temperature phase of $LiBH_4$. Such a material having diffraction peaks at five regions even at a temperature lower than the transition temperature of the high temperature phase of $LiBH_4$ (115° C.) tends to exhibit high ion conductivity even at a temperature lower than the transition temperature.

The ionic conductor obtained by the manufacturing method of the present invention contains lithium (Li), borohydride ($BH_4^-$) and a halogen atom as major components, and may also contain components other than these components. Examples of the other components include oxygen (O), nitrogen (N), silicon (Si) and germanium (Ge).

3. Solid Electrolyte for All-Solid-State Batteries and All-Solid-State Battery

According to another embodiment of the present invention, it is possible to provide a solid electrolyte for all-solid-state batteries, which comprises an ionic conductor obtained by a method including: mixing, using a solvent, $LiBH_4$ and a lithium halide represented by formula (1):

$$LiX \qquad (1)$$

wherein X represents one selected from the group consisting of halogen atoms; and removing the solvent at 60 to 280° C. Further, according to yet another embodiment of the present invention, it is possible to provide an all-solid-state battery, which is obtained by using the solid electrolyte for all-solid-state batteries.

In this specification, the all-solid-state battery is an all-solid-state battery in which lithium ions perform electrical conduction, and particularly an all-solid-state lithium-ion rechargeable battery. The all-solid-state battery has a structure in which a solid electrolyte layer is disposed between a positive electrode layer and a negative electrode layer. The ionic conductor of the present invention may be contained as the solid electrolyte in at least one of the positive electrode layer, negative electrode layer and solid electrolyte layer. When used in an electrode layer, use in the positive electrode layer is more preferred compared to use in the negative electrode layer. This is because a side reaction is less likely to be caused in the positive electrode layer compared to the negative electrode layer. When the ionic conductor of the embodiment is contained in the positive electrode layer or negative electrode layer, the ionic conductor is used in combination with a publicly-known positive active material or negative active material for lithium-ion rechargeable batteries. As the positive electrode layer, a bulk type in which an active material and a solid electrolyte are mixed together is preferably used because the capacity per single cell is larger.

The all-solid-state battery is prepared by forming and laminating the above-described layers, and the forming method and laminating method for the respective layers are not particularly limited. Examples thereof include: a method in which a solid electrolyte and/or an active material are dispersed in a solvent to provide a slurry-like mixture, which is applied by a doctor blade, spin coating or the like and subjected to rolling to form a film; a gas phase method in which film forming and lamination are performed by using a vacuum deposition method, ion plating method, sputtering method, laser ablation method or the like; and a pressing method in which powder is formed by hot pressing or cold pressing (not heating) and laminated. Since the ionic conductor of the embodiment is relatively soft, it is particularly preferred to prepare a battery by forming by pressing and lamination. Further, the positive electrode layer can also be formed by using a sol-gel method.

EXAMPLES

Hereinafter, the present invention will be more specifically described by way of examples, but the content of the present invention is not limited thereby.

Example 1

In a glovebox under argon atmosphere, LiI (manufactured by Aldrich, purity: 99.9%) was weighed and put into a three-necked flask, and a 10% THF solution of $LiBH_4$ (manufactured by Lockwood Lithium, Product No. 401653) was added thereto so that the molar ratio of $LiBH_4$:LiI became 0.75:0.25 [when $LiBH_4$: LiI=x: (1−x), x=0.75], followed by mixing. Solution mixing was carried out at 50° C. for 1 hour, thereby obtaining a sufficiently homogenous solution.

The obtained solution was dried under vacuum at 150° C. for 3 hours while flowing argon at a flow rate of 5 cc/min, thereby obtaining a white ionic conductor (0.75 $LiBH_4$-0.25 LiI).

Example 2

A white ionic conductor (0.75 $LiBH_4$-0.25 LiI) was obtained in a manner similar to that in Example 1, except that the temperature at the time of drying was 200° C.

Example 3

A white ionic conductor (0.75 $LiBH_4$-0.25 LiI) was obtained in a manner similar to that in Example 1, except that the temperature at the time of drying was 250° C.

Example 4

A white ionic conductor (0.75 $LiBH_4$-0.25 LiI) was obtained in a manner similar to that in Example 1, except that the temperature at the time of drying was 280° C.

Comparative Example 1

In a glovebox under argon atmosphere, $LiBH_4$ (manufactured by Aldrich, purity: 90%) and LiI (manufactured by Aldrich, purity: 99.9%) were mixed together with a molar ratio of $LiBH_4$:LiI=0.75:0.25 [when $LiBH_4$:LiI=x: (1−x), x=0.75], and the obtained mixture was transferred to a molybdenum container. After that, it was heated to 320° C. using an autoclave to perform melt-mixing. After that, this molten mixture was cooled to room temperature, thereby obtaining a white ionic conductor (0.75 $LiBH_4$-0.25 LiI).

<X-Ray Diffraction Measurement>

Powders of the ionic conductors obtained in Examples 1-4 and Comparative Example 1 were subjected to the X-ray diffraction measurement under Ar atmosphere at room temperature (X'pert³ Powder manufactured by PANalytical, CuKα: λ=1.5405 Å). The obtained diffraction peaks are shown in FIG. 1.

In Examples 1-4 and Comparative Example 1, the diffraction peaks were observed at at least 2θ=23.5±0.3 deg, 24.9±0.3 deg, 26.7±0.3 deg, 34.6±0.5 deg and 40.9±0.5 deg, and peaks belonging to 0.75 $LiBH_4$-0.25 LiI crystal were shown.

<Ion Conductivity Measurement>

Each of the ionic conductors obtained in Examples 1-4 and Comparative Example 1 was subjected to uniaxial molding (240 MPa) to obtain a disk having a thickness of about 1 mm and a diameter of 8 mm. The AC impedance was measured by the four-terminal method utilizing a lithium electrode at 10° C. intervals in a temperature range of room temperature to 150° C. (SI1260 IMPEDANCE/GAIN-PHASE ANALYZER), and the ion conductivity was calculated. Specifically, the disk obtained in the above-described manner as a sample was put into a thermostatic bath with its temperature being set at 25° C. and it was kept for 30 minutes, and after that, the ion conductivity was measured. Subsequently, the temperature of the thermostatic bath was increased at 10° C. intervals from 30° C. to 150° C., and the same operation was carried out at each temperature. After the measurement at 150° C. was finished, the temperature of the thermostatic bath was decreased at 10° C. intervals from 140° C. to 30° C., and at each temperature, the state was kept for 40 minutes and then the ion conductivity was measured. Subsequently, the temperature of the thermostatic bath was decreased to 25° C., and after it was kept for 40 minutes, the ion conductivity was measured. The measurement frequency range was 0.1 Hz to 1 MHz, and the amplitude was 50 mV.

Figure 2:
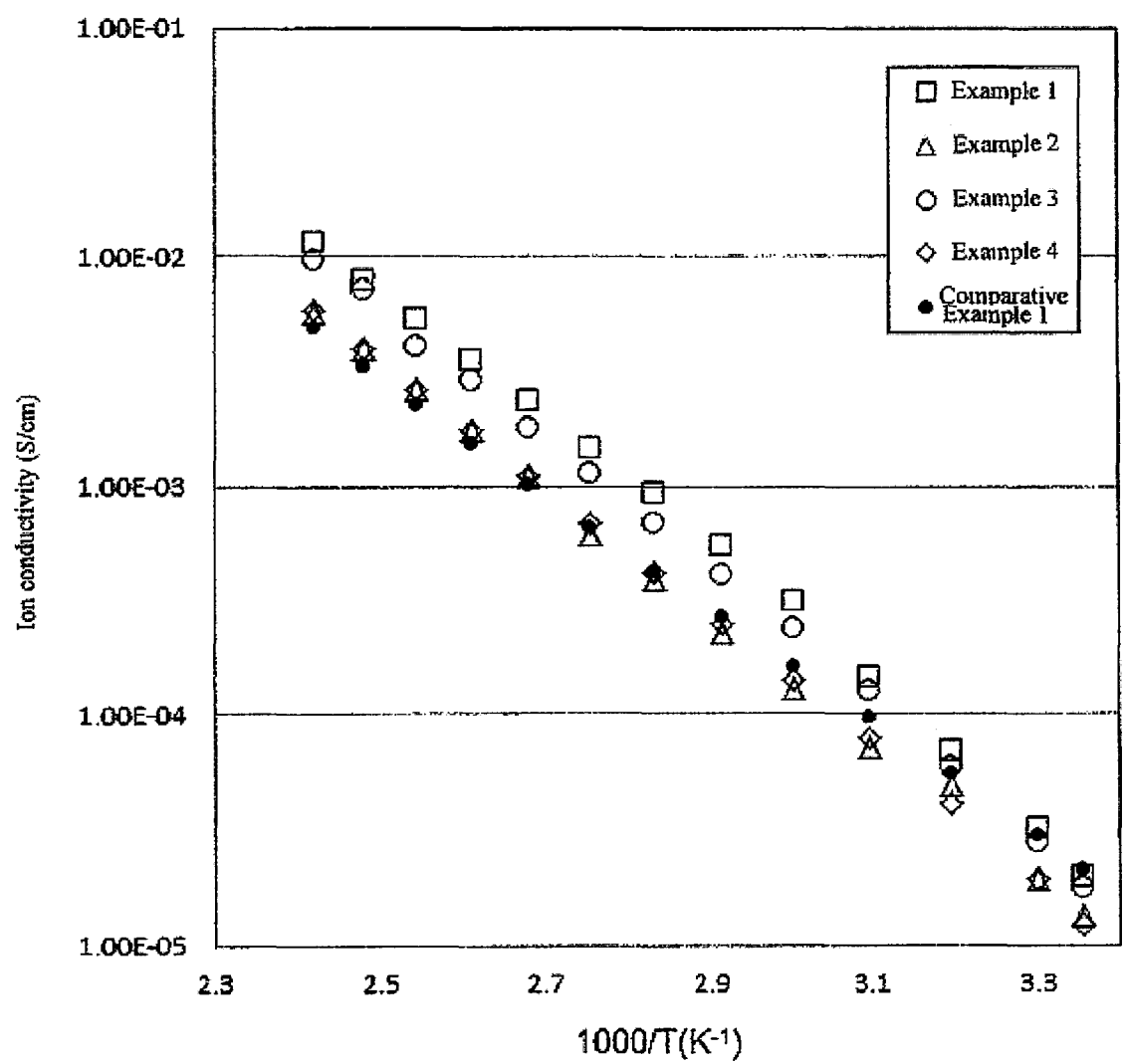
FIG. 2 shows ion conductivities of the ionic conductors obtained in Examples 1-4 and Comparative Example 1.

Regarding the ionic conductors of Examples 1-4 and Comparative Example 1, the measurement results of the lithium-ion conductivity at 150° C. and each temperature at the time of decreasing the temperature from 150° C. are shown in FIG. 2.

Next, regarding the case of using a lithium halide having a water content of 50 ppm or more, an ionic conductor was produced as described below.

<Method for Measuring Water Content in Lithium Halide>

The water content in the lithium halide was measured using a Karl Fischer moisture meter (model 851/1), a stirrer (model 801) and an auto-sampler (model 874) manufactured by Metrohm, and a dedicated sealed vial. As a titration reagent, a new Karl Fischer reagent for water content measurement, HYDRANAL-Coulomat AG-Oven (manufactured by Hayashi Pure Chemical Ind., Ltd.) was selected.

100 mg of lithium halide powder was put into a dedicated vial in a glovebox under argon atmosphere to obtain a measurement sample. Note that for a blank, argon in the glovebox was used.

The measurement sample was analyzed with a sample heating temperature of 200° C., an extraction time of 300 seconds, an extraction temperature of 25° C., titration end of 5 μg/min (relative drift) and an end point setting of 50 mV. The measurement data was analyzed using an analysis software: tiamo (Ver 2.3) manufactured by Metrohm. The end point (EP) of titration analysis was determined using the function of "Set EP with parallel tangents". In this regard, as the tangent lines, those corresponding to baselines before titration (0 to 20 sec) and after titration (250 to 300 sec) were used. The weight of water (μg) was calculated based on the obtained end point (EP), and the water content in the lithium halide was calculated using the below-described formula A.

{Weight of water in measurement sample (μg)−
weight of water in blank (μm)}/weight of
lithium halide (g)=water content in lithium
halide (ppm)　　　(formula A)

<Treatment for Obtaining Lithium Halide Having Different Water Content (1)>

A mixed gas consisting of argon and water (water content: 300 ppm) was flowed through a container in which a lithium halide was put for a predetermined amount of time, thereby further preparing a lithium halide having a different water content. The obtained lithium halide having a water content of 290 ppm was used in Example 5 described below to produce an ionic conductor.

<Treatment for Obtaining Lithium Halide Having Different Water Content (2)>

LiI having a water content of 2000 ppm (manufactured by Wako Pure Chemical Industries, Ltd., purity: 97% or more, Lot. No. LKM6992) was dissolved in ultra-pure water. Excess water was removed by an evaporator (6 hours, rotation speed: 120 rpm, hot water temperature: 60° C., vacuum degree: 5 hPa), thereby obtaining a trihydrate of LiI. The trihydrate of LiI was subjected to vacuum drying (vacuum degree: $6.7 \times 10^{-1}$ Pa) at room temperature for 24 hours to prepare LiI having a water content of 70000 ppm.

The obtained lithium halide having the water content of 70000 ppm was used in Examples 7-8 and Comparative Example 2 described below to produce ionic conductors.

Example 5

Firstly, LiI (manufactured by Sigma-Aldrich, purity: 99.9% or more, Lot. No. MKBT8164V) was subjected to the above-described treatment to produce an alkali metal compound having a water content of 290 ppm. In a glovebox under argon atmosphere, the compound was weighed and put into a three-necked flask, and a THF solution of $LiBH_4$ (manufactured by Lockwood Lithium) was added thereto so that the molar ratio of $LiBH_4$:LiI became 0.75:0.25 [when $LiBH_4$:LiI=x: (1−x), x=0.75], followed by mixing. Solution mixing was carried out at 50° C. for 1 hour, thereby obtaining a sufficiently homogenous solution.

The obtained solution was dried under vacuum at 200° C. for 3 hours while flowing argon at a flow rate of 5 cc/min, thereby obtaining a white ionic conductor (0.75 $LiBH_4$-0.25 LiI).

Example 6

A white ionic conductor (0.75 $LiBH_4$-0.25 LiI) was obtained in a manner similar to that in Example 5, except that LiI having a water content of 2000 ppm (manufactured by Wako Pure Chemical Industries, Ltd., purity: 97% or more, Lot. No. LKM6992) was used and that mixing of the THF solution of $LiBH_4$ with LiI was performed at room temperature for 30 minutes, thereby obtaining a sufficiently homogenous solution.

Example 7

LiI having a water content of 2000 ppm and LiI having a water content of 70000 ppm were mixed together at a predetermined ratio, thereby obtaining LiI having a water content of 10000 ppm. A white ionic conductor (0.75 $LiBH_4$-0.25 LiI) was obtained in a manner similar to that in Example 6, except that the obtained LiI having a water content of 10000 ppm was used.

Example 8

LiI having a water content of 2000 ppm and LiI having a water content of 70000 ppm were mixed together at a predetermined ratio, thereby obtaining LiI having a water content of 25700 ppm. A white ionic conductor (0.75 $LiBH_4$-0.25 LiI) was obtained in a manner similar to that in Example 6, except that the obtained LiI having a water content of 25700 ppm was used.

Comparative Example 2

A white ionic conductor (0.75 $LiBH_4$-0.25 LiI) was obtained in a manner similar to that in Example 6, except that LiI having a water content of 70000 ppm was used.

Figure 3:
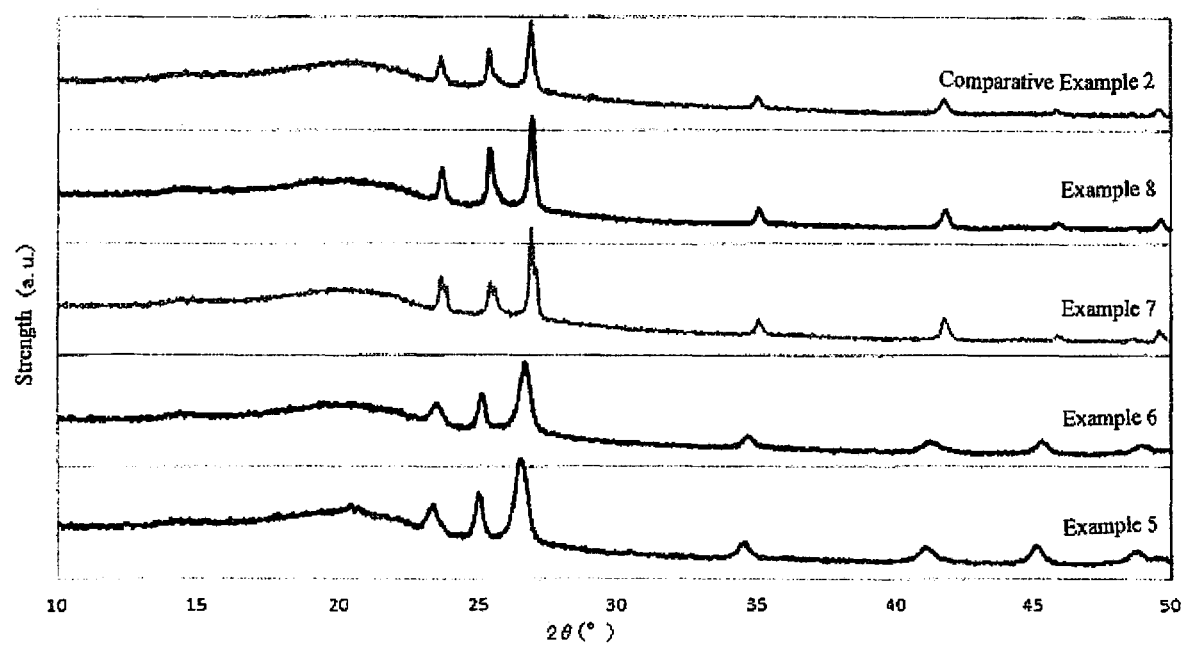
FIG. 3 shows X-ray diffraction patterns of the ionic conductors obtained in Examples 5-8 and Comparative Example 2.

The ionic conductors of Examples 5-8 and Comparative Example 2 were subjected to the X-ray diffraction measurement and the ion conductivity measurement in manners similar to those for the ionic conductors obtained in Examples 1-4 and Comparative Example 1. X-ray diffraction patterns of the ionic conductors obtained in Examples 5-8 and Comparative Example 2 are shown in FIG. 3.

Figure 4:
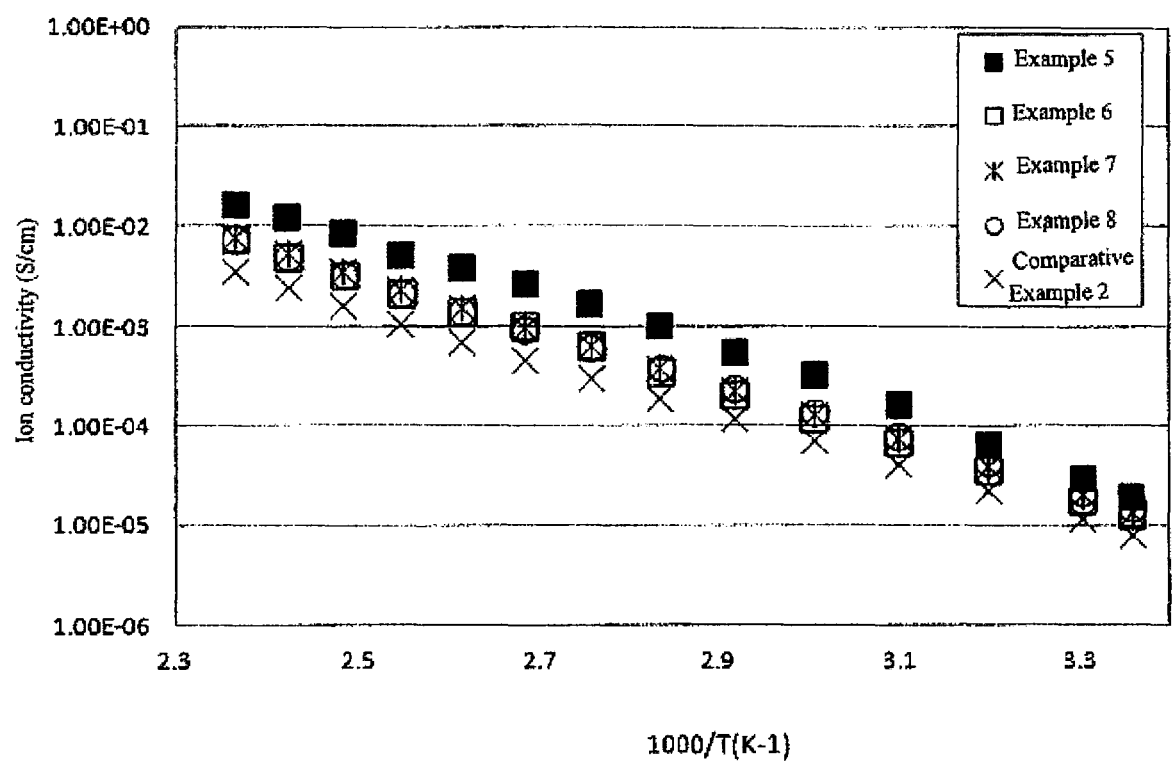
FIG. 4 shows ion conductivities of the ionic conductors obtained in Examples 5-8 and Comparative Example 2.

Further, lithium-ion conductivities of the ionic conductors obtained in Examples 5-8 and Comparative Example 2 are shown in FIG. 4.

Note that the ion conductivities of Examples 5-8 and Comparative Example 2 were as described below.

TABLE 1

| | Water content in LiI (ppm) | Lithium-ion conductivity (S/cm) | |
|---|---|---|---|
| | | 25° C. | 150° C. |
| Example 5 | 290 | $2.0 \times 10^{-5}$ | $1.7 \times 10^{-2}$ |
| Example 6 | 2000 | $1.3 \times 10^{-5}$ | $7.8 \times 10^{-3}$ |
| Example 7 | 10000 | $1.4 \times 10^{-5}$ | $8.3 \times 10^{-3}$ |
| Example 8 | 25700 | $1.6 \times 10^{-5}$ | $7.8 \times 10^{-3}$ |
| Comparative Example 2 | 70000 | $0.8 \times 10^{-5}$ | $3.7 \times 10^{-3}$ |

The several embodiments of the present invention were described above, but these embodiments were presented as examples and it is not intended to limit the scope of the invention thereby. These novel embodiments can be practiced in other various modes and can be omitted, substituted or modified variously without departing from the gist of the present invention. These embodiments and modifications thereof are included in the scope or gist of the invention and also included in the scope of the inventions recited in the claims and equivalents thereof.

The invention claimed is:

1. A method for manufacturing a crystallized solid electrolyte ionic conductor, said method including:

adding LiBH$_4$ to a solvent comprising a lithium halide; or
adding a lithium halide to a solvent comprising LiBH$_4$;
or adding LiBH$_4$ and a lithium halide, as separate compositions, to a solvent;

mixing, in the solvent, the LiBH$_4$ and the lithium halide, wherein the lithium halide is represented by formula (1):

$$\text{LiX} \qquad (1)$$

wherein X represents one selected from the group consisting of halogen atoms; and removing the solvent at 60 to 280° C.;

wherein the lithium halide has a water content of 50 to 26000 ppm;

wherein crystallization of the crystallized solid electrolyte ionic conductor is performed by heating the crystallized solid electrolyte ionic conductor at a temperature of 50° C. to 300° C.; and wherein the crystallized solid electrolyte ionic conductor has diffraction peaks at least 2θ=23.9±1.2 deg, 25.6±1.5 deg, 27.3±1.5 deg, 35.4±2.0 deg and 42.2±2.0 deg in X-ray diffraction (CuKα: λ=1.5405 Å).

2. The method for manufacturing the crystallized solid electrolyte ionic conductor according to claim 1, wherein the solvent is an ether-based solvent.

3. The method for manufacturing the crystallized solid electrolyte ionic conductor according to claim 2, wherein the ether-based solvent is selected from tetrahydrofuran, 2-methyltetrahydrofuran and cyclopentyl methyl ether.

* * * * *